United States Patent
Klein (10) Patent No.: US 12,182,470 B2
(45) Date of Patent: *Dec. 31, 2024

(54) MOTION ACTIVATED SOUND GENERATING AND MONITORING MOBILE APPLICATION

(71) Applicant: Whisper Capital LLC, Chicago, IL (US)

(72) Inventor: Russell B. Klein, Chicago, IL (US)

(73) Assignee: Whisper Capital LLC, Chicago, IL (US)

( * ) Notice: Subject to any disclaimer, the term of this patent is extended or adjusted under 35 U.S.C. 154(b) by 183 days.

This patent is subject to a terminal disclaimer.

(21) Appl. No.: 18/085,363

(22) Filed: Dec. 20, 2022

(65) Prior Publication Data

US 2023/0125444 A1     Apr. 27, 2023

Related U.S. Application Data

(63) Continuation-in-part of application No. 17/511,257, filed on Oct. 26, 2021, now Pat. No. 11,531,513, (Continued)

(51) Int. Cl.
*G06F 3/16* (2006.01)
*G06F 3/01* (2006.01)
(Continued)

(52) U.S. Cl.
CPC ............... *G06F 3/16* (2013.01); *G06F 3/011* (2013.01); *G06F 3/017* (2013.01); *G10L 21/10* (2013.01); *G10L 25/78* (2013.01)

(58) Field of Classification Search
None
See application file for complete search history.

(56) References Cited

U.S. PATENT DOCUMENTS

| | | | |
|---|---|---|---|
| 2014/0253478 A1* | 9/2014 | Jeong | G06F 3/04883 345/173 |
| 2015/0061842 A1* | 3/2015 | Yoon | G04G 21/04 340/12.5 |

(Continued)

OTHER PUBLICATIONS

Schenell et al., "CollectiveLoops—MultimodalInteractionsThroughCo-locatedMobile DevicesandSynchronizedAudiovisualRendering BasedonWebStandards," Mar. 20,2017,https://dl.acm.org/doi/pdf/10.1145/3024969.3024972. (Year: 2017).*

*Primary Examiner* — Tuan S Nguyen
(74) *Attorney, Agent, or Firm* — K&L Gates LLP (57) ABSTRACT

The present system includes a wearable device, a user device, and a player device. The wearable device comprises a motion sensor configured to provide motion data. The user device is configured to receive a user input from a user, receive the motion data from the wearable device, and determine sound data based on the motion data, wherein the sound data includes sound volume data. The player device includes a processor in communication with a plurality of user devices and a memory, wherein the processor is configured to receive a collective sound data from the plurality of users associated with a selected subject matter and produce a collective sound output for the plurality of users at the same time based on the collective sound data, wherein the collective sound output is associated with the selected subject matter.

11 Claims, 4 Drawing Sheets

Related U.S. Application Data which is a continuation of application No. 16/989,611, filed on Aug. 10, 2020, now Pat. No. 11,157,230.

(60) Provisional application No. 62/884,794, filed on Aug. 9, 2019.

(51) Int. Cl.
*G10L 21/10* (2013.01)
*G10L 25/78* (2013.01)

(56) References Cited

U.S. PATENT DOCUMENTS

| 2016/0259420 | A1* | 9/2016 | Kim | G06F 3/017 |
| 2017/0371418 | A1* | 12/2017 | Kwon | G01H 17/00 |

* cited by examiner

MOTION ACTIVATED SOUND GENERATING AND MONITORING MOBILE APPLICATION

CROSS-REFERENCE TO RELATED APPLICATIONS

This application comprises a continuation-in-part of U.S. application Ser. No. 17/511,257 filed Oct. 26, 2021, which comprises a continuation application of U.S. application Ser. No. 16/989,611 filed Aug. 10, 2020, which claims the benefit of U.S. Provisional Application No. 62/884,794 filed on Aug. 9, 2019, the entireties of which are incorporated herein by reference.

BACKGROUND OF THE INVENTION

The present subject matter relates generally to systems and methods for generating sound effects via a user device. More specifically, the present invention relates to a system for enabling a community of users to collectively generate sound effects at events, monitoring individual and aggregate data related to use, and displaying user activity on a screen display.

Various mobile application exists for generating sound. For example, a mobile application can allow a user to select various sounds from a theme (e.g., animals, sports, cheers, sirens, alarms, etc.), wherein the user can activate the sound by using the user interface. In another example, the sound can be generated based on motion of the mobile device.

Further applications exist that monitor and track constant activity using a gyroscope, compass, and/or accelerometer within the mobile device. For example, various applications track the number of steps of a user, the number of stairs climbed, the distance a user travels. However, such monitoring applications can have a depreciatory effect on the battery life of a mobile device.

There is a need for systems and methods that for providing motion-activated sound effects that can be monitored, collected, and analyzed for a plurality of users, as described herein.

BRIEF SUMMARY OF THE INVENTION

The present disclosure provides a system for a mobile application for generating sound effects based on motion, monitoring the sound effects generated by a plurality of users, and communicating the results to a plurality of user interfaces. Various examples of the systems are provided herein.

In one embodiment, the system includes one or more user devices in communication over a network. A controller facilitates communications between the mobile devices and is in communication with other displays such as a screen or Jumbotron. A database used in connection with the controller stores data, such as sound effects, that are provided to the user devices.

The database includes a repertoire of digitized sound effects that can be downloaded and/or activated by the user devices. For example, a user can select a sound associated with a team mascot, such as woofs, barks, growls, howls, shrieks, etc., to represent the team mascot, such as dogs, tigers, lions, bears, timber wolves, bulldogs, hawks, eagles, ravens, etc. Sports fans may select the sound effects that best match up with their sports team mascots.

The system may include a mobile device application installed on devices that permit users to select sound effects. A memory configured to store program instructions executable by the controller is coupled to the controller.

Each user device includes a motion sensor that detects motion of the device 102. The motion sensor can be an accelerometer, gyroscope, global positioning system, among others. The system, via a controller, can analyze the motion data to generate a sound output in real time. For example, as the user shakes his or her mobile device, the system can simultaneously generate a sound output based on the received data. Upon a user shaking their mobile phone, the system produces the selected sound effect. The motion data can include time data (e.g., the amount of time a user moves the mobile device), intensity data (e.g., the force at which the user moves the mobile device), directional data (e.g., the directions the user moves the mobile device), among others.

In some embodiments, the system includes a wristband, bracelet, ring, or other wearable device that includes a motion sensor such as an accelerometer, gyroscope, or global positioning system. The user device communicates with the wearable device to receive motion data in real time, which is then used to generate a sound output also in real time. The motion data generated by the wearable device can include time data, intensity data, and directional data as well.

The system analyzes the motion data to generate sound output. For example, the duration of the motion data can be used to determine the duration of the sound output. The system can determine a type of sound based on the type of motion and/or direction of motion. For example, changing linear motion can produce a first sound, whereas circular movement may create a second sound. The system can determine a volume of the generated sound based on the intensity of the user motion of the mobile device.

The present system provides a fusion of motion sensing processor technology with motion activated sound effects (e.g., MP3) to create a unique application for a digital noise-maker that can be used for business and/or entertainment use by online and/or live communities of sports fans and spectators. The present system empowers fans to celebrate and express their collective passions and cheers at a single point in time. The system allows users to celebrate and express themselves simultaneously, regardless of location.

The system can allow a mobile phone and/or wearable device to be intentionally shaken in hand in any repetitive motion, twisting, spinning, or most commonly shaken. With each completed motion (e.g., at least one change in direction of the mobile device) a sound effect is produced. Users can choose their team on the app and produce the team's sound by deliberate movement of their device.

The system will automatically synchronize the common sound effects within a specified range to maximize the fidelity. For example, a bear's growl, a lion's roar, or a phrase such as "DE-FENSE." The present system can create digital, physical, and digital-physical communities.

The system can synchronize with other users of the present system, regardless of location, including in-home and out-of-home (i.e., watch parties, bars, etc.). People consuming the game remotely can also produce sound and/or reactions at the game venue. The system can allow an individual user to transmit selected sound effects to another individual user who has granted permission rights to receive present application to serve as a "rally starter" meant to alert other users in the community to open their present mobile application and begin sounding off for their team.

The present system can support the use of different sound effects regardless of concurrent use. For example, at an Ohio State University versus University of Michigan football game, fans for the Michigan Wolverines can activate the app to create the sound of a growling Wolverine while at the same time Ohio State Buckeyes fans could use the app to create the "Let's go Bucks" cheer.

In addition, the system can measure competition. For example, sound effects for opposing teams can be connected via network to remote receivers at in-stadium Jumbotrons and broadcast locations covering the event/game. Results may be visualized and presented to in-stadium as well as viewing/listening audiences to illustrate how engaged one or both teams are.

For example, before or during halftime, messages on an event venue's displays may urge the audience to download the app and prepare for a competition. Fans would choose their team in the app and activate the device with motion at a designated time. A virtual tug of war would be featured on the displays. In-home or in-venue incentives (e.g., promotions and discount) could nudge users to participate.

An advantage of the present system is connecting users, via social media, watching the same sporting event. For example, users of the system connect via the present mobile application or social media as they watch the same sporting event from any location.

An advantage of the present system includes the dynamic appeal to gain more followers and expand their individual connected fan community drives the popularity and use of the application.

An advantage of the present system is that users may be asked for permission to share their personal data, which may be aggregated and sold to advertisers and sponsors, and yield insights to improve the user experience design.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The sound effect systems and methods described in the present application enable users to generate motion-activated sound effects through their user devices. As a connected community, users can generate a common sound effect, the collective activity of which can be measured.

Figure 1:
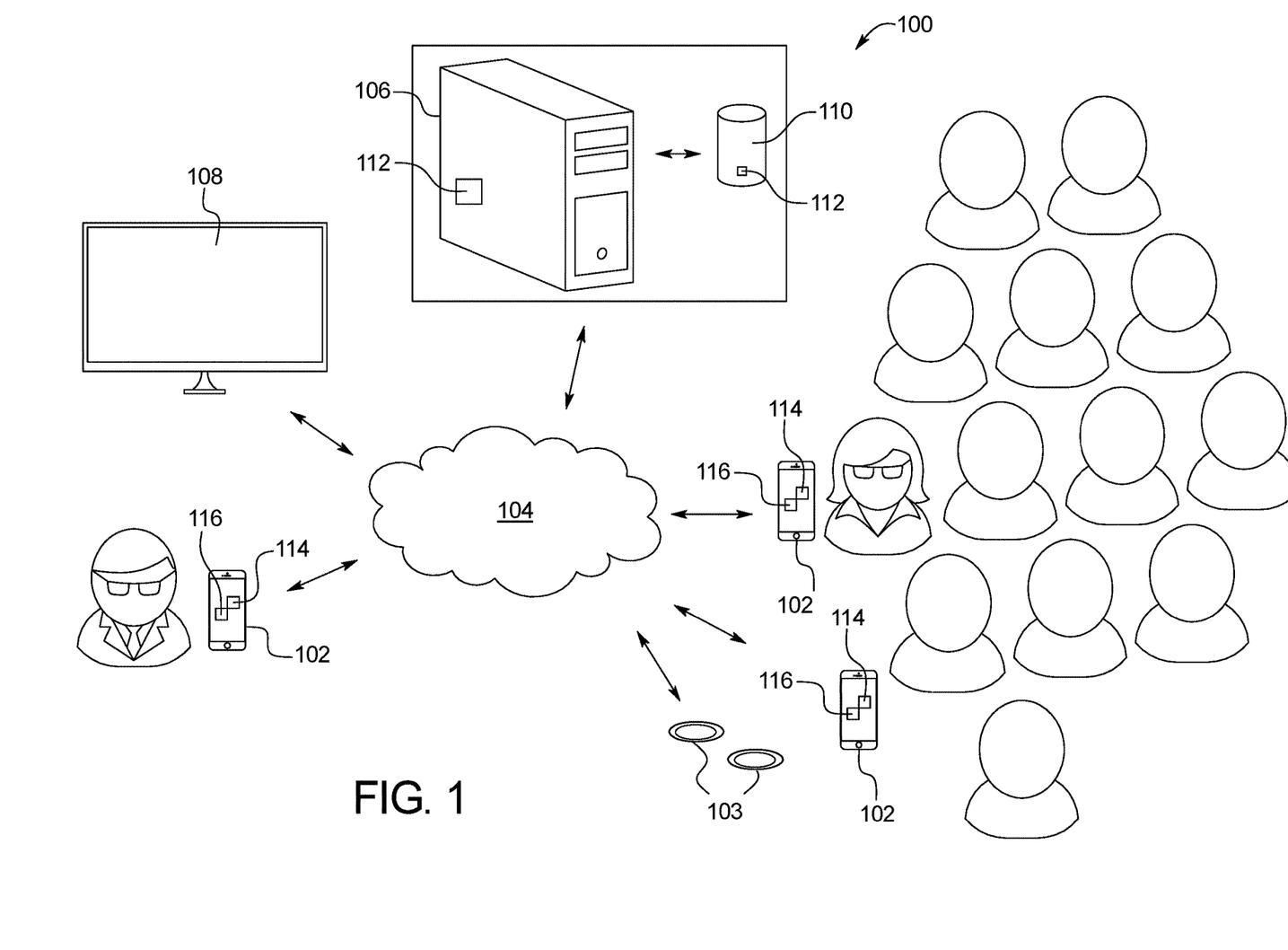
FIG. 1 is a schematic representation of an embodiment of the system of the present application.

FIG. 1 is an example of a sound effect system 100 for generating sound effects on user devices and collectively monitoring the activity. A plurality of user devices 102 communicate across a network 104 such as the internet. A controller 106 facilitates communications between the mobile devices 102. The controller 106 may also be in communication with other displays 108 such as a screen or Jumbotron. A database 110 used in connection with the controller 106 stores data 112, such as sound effects, that are provided to the user devices. The system 100 may also include a plurality of wearable devices 103 that also communicate through the network 104 to the controller 106 and the database 110.

Figure 2A:
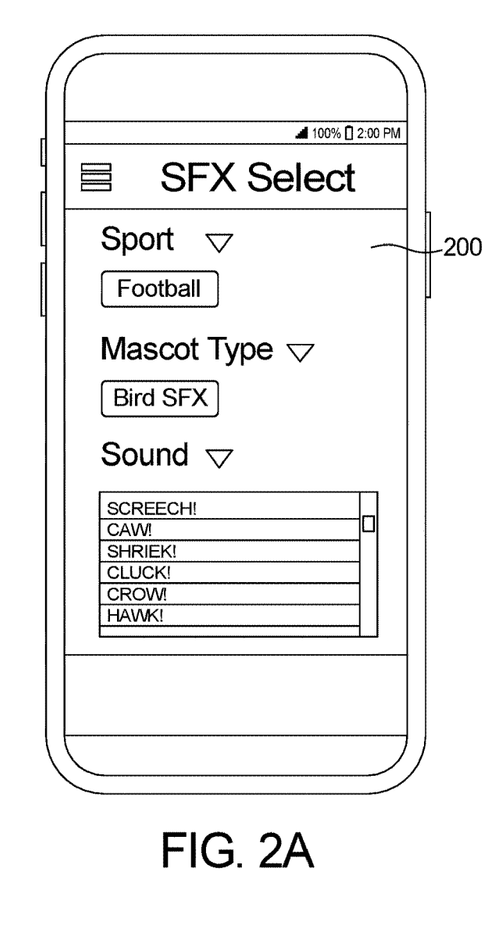
FIGS. 2A-2C are exemplary user interfaces of the system of FIG. 1.
Figure 2B:
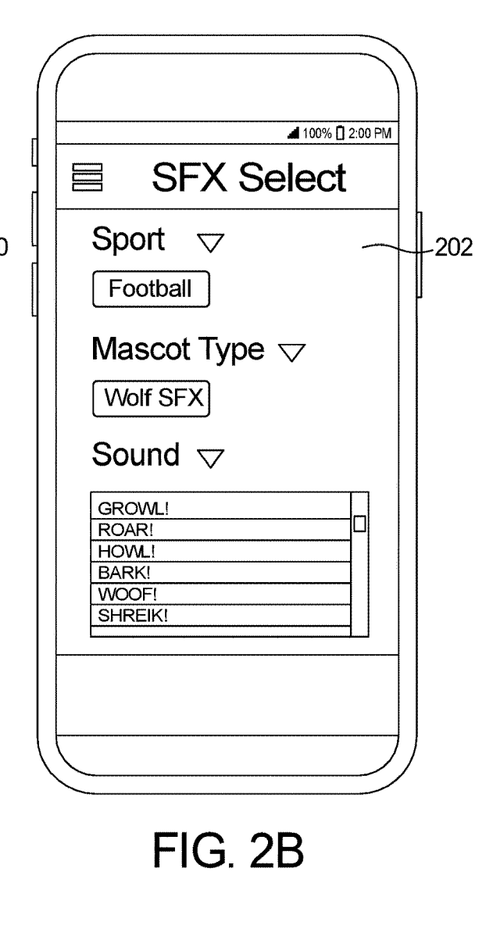
Figure 2C:
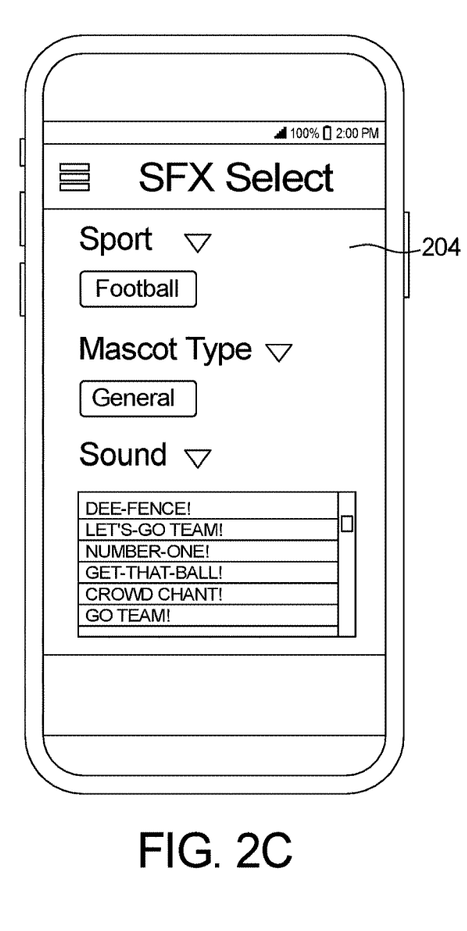

The database 110 includes a repertoire of digitized sound effects 112 that can be downloaded and/or activated by the user devices. For example, a user can select a sound 112 associated with a team mascot, such as woofs, barks, growls, howls, shrieks, etc. to represent the team mascot, such as dogs, tigers, lions, bears, timber wolves, bulldogs, hawks, eagles, ravens, etc. Sports fans may select the sound effects that best match up with their sports team mascots. Exemplary user interfaces 200, 202, 204 are illustrated in FIGS. 2A-2C, respectively.

The system 100 may include a mobile device application 114 installed on devices 102 that permit users to select sound effects 112. A memory configured to store program instructions executable by the controller is coupled to the controller 106.

Figure 3:
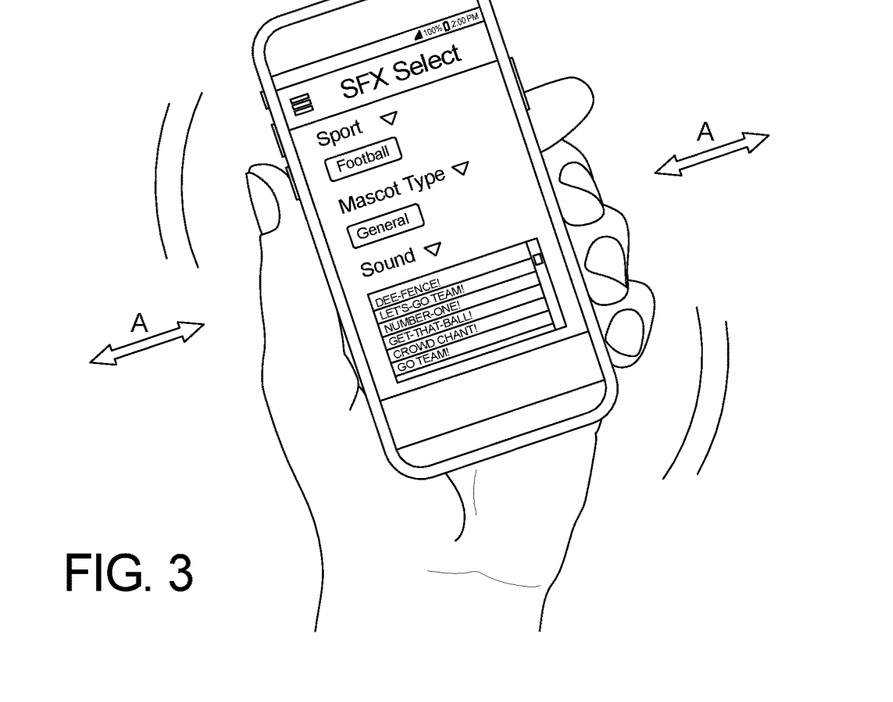
FIGS. 3 and 4 illustrate movement of the user device utilizing the system of FIG. 1.
Figure 4:
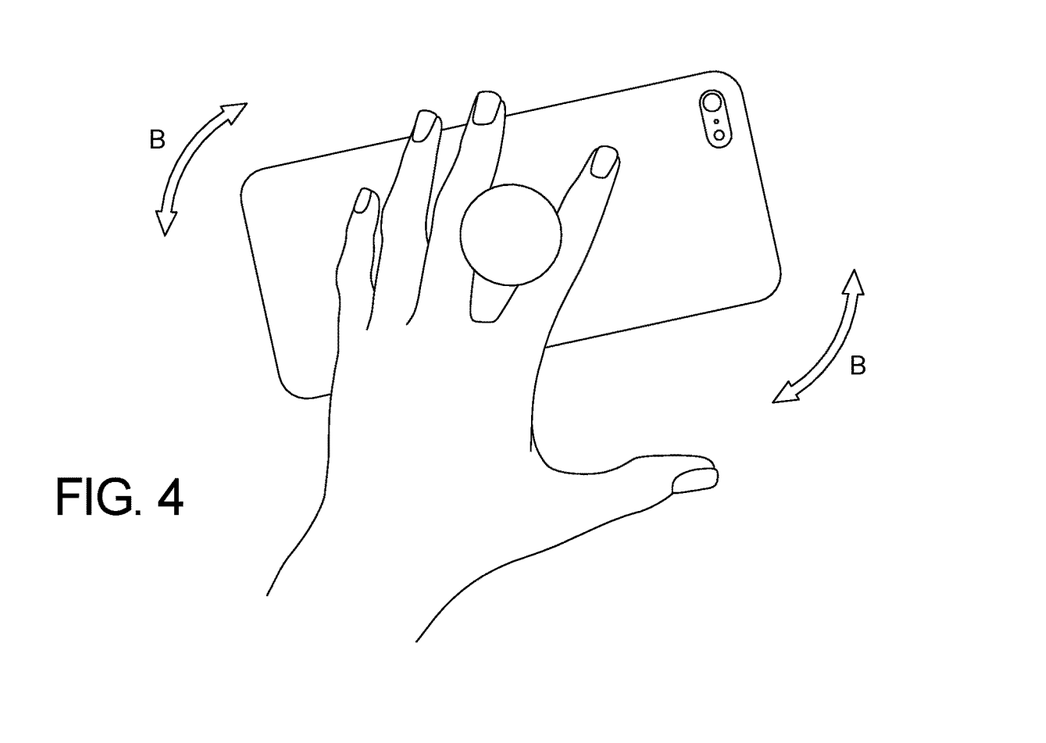

Each user device 102 and wearable device 103 includes a motion sensor 116 that detects motion of the device 102. The motion sensor 116 can be an accelerometer, gyroscope, global positioning system, among others. The system 100, via a controller 102, can analyze the motion data to generate a sound output in real time. For example, as the user shakes his or her mobile device 102 as shown in FIGS. 3 and 4 or shake his or her hand wearing the wearable device 103, the system 100 can simultaneously generate a sound output based on the received data. Upon a user shaking their mobile phone 102 or wearable device 103, the system 100 produces the selected sound effect. The motion data can include time data (e.g., the amount of time a user moves the mobile device), intensity data (e.g., the force at which the user moves the mobile device), directional data (e.g., the directions the user moves the mobile device), among others.

In some embodiments, each wearable device 103 is associated with a mobile device application 114 installed on a user device 102. The motion data may be collected through the wearable device 103, the user device 102, or a combination thereof. In other embodiments, a plurality of wearable devices 103 may be associated with a display screen 108 such as a Jumbotron or other player device. In this embodiment, the wearable devices 103 and the display screen 108 communicate with the controller 112 over the network 104, and the controller 112 analyzes the motion data to generate the sound output in real time. The sound output is provided through a sound system associated with the display screen 108. In still further embodiments, the system 100 includes one or more wearable devices 103 associated with mobile device applications 114 on user devices 102 and one or more wearable devices 103 in direct communication with the controller 112 and the display screen 108.

The system 100 can analyze the motion data to generate sound output. For example, the duration of the motion data can be used to determine the duration of the sound output. The system can determine a type of sound based on the type of motion and/or direction of motion. For example, changing linear motion as shown in FIG. 3 can produce a first sound, whereas circular movement as shown in FIG. 4 may create a second sound. The wearable device 103 can provide similarly distinct motions such as linear and circular. The system can determine a volume of the generated sound based on the intensity of the user motion of the mobile device.

The system may generate sound data and resulting output sound associated with the generated sound data for each motion in real time. As a result, during the time a user is shaking the mobile device 102 or wearable device 103, the system 100 can alter the sound output in real time depending on the duration, intensity, and direction of the shaking. For example, as the user shakes the mobile device more vigorously, the sound output increases the volume of the sound output, as the user shakes the mobile device lightly the system can reduce the volume of the sound output, as the user changes from shaking to a circular motion the controller changes the type of sound, etc. In other words, the controller 102 can generate sound data associated with sound output that may be continuously changing in response to the user movement in real time.

The system 100 can determine collective sound data produced by a plurality of users engaged with the mobile application platform for each particular subject matter. For example, the system can collect user motion associated with a selected subject matter over a plurality of users. The system 100 may aggregate motion data for users associated with the subject matter of a particular sports team, on a particular day and time, a selected event, and/or a selected location. The system 100 can determine the collected sound data for the collective user data and communicate the collective sound data (i.e., for the collective sound generated) to various user interfaces. In some embodiments, the system 100 collects data from mobile devices 102 alone. In other embodiments, the system 100 collects data from wearable devices 103 alone. In still further embodiments, the system 100 collects data from both mobile devices 102 and wearable devices 103.

The system 100 monitors data related to the generation of sound effects at a given time. Through the network 104, the controller 106 may detect a volume of a single sound generated among a plurality of users. For example, a plurality of users may use the mobile app to generate sound during a game or event. A crowd at a stadium may include a first plurality of users generating a first sound related to one team, and a second plurality of users may generate a second sound related to the other team. Screens within the stadium may indicate whether there are more fans of one team present than the other or whether one plurality is louder than the other plurality. The controller may monitor all fans generating the specific sound effects during the game such that the screen in the stadium indicates whether there are more engaged fans of one team than the other using the mobile application 114.

Users of the application 114 can connect with their sports team's fan-base and/or community at large and individually. The system cumulatively produces an individual and aggregate measurement of the shaking activity at any given point in time. The amplitude of the sound can be based on the number of mobile devices that are moved (i.e., shaken), the frequency of shaking by each user, the level of aggressive shaking action at a given point in time, the amount of aggregated "virtual noise" emanating from the fan community.

In on example, when two or more mobile devices are "sounding off" (e.g., by users shaking their mobile device), the system can synchronize to maintain fidelity of sound. For example, the system can include automatically synchronizing of all active sound effects generated due to the shaking of devices 102 for the same team, both in and outside stadiums and arenas.

In some embodiments, the system 100 may provide a message to mobile devices 102 that have selected the same sound effect 112 indicating a time to shake their mobile device 102 or wearable device 103, the locations of the other such mobile devices 102, and other details.

Figure 5:
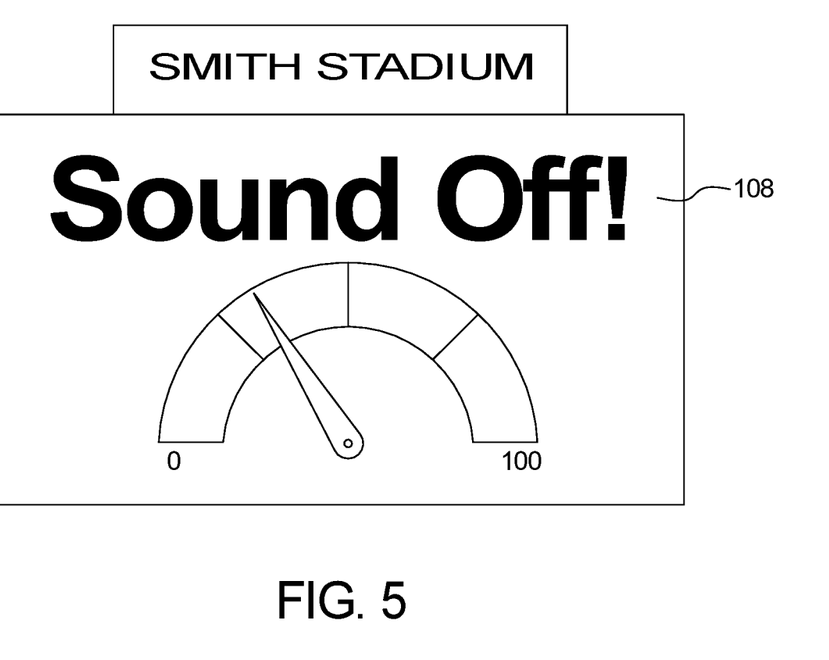
FIG. 5 illustrates a display indicating use of the system of FIG. 1.

The system 100 can measure individual and collective user motion and/or sound generated. For example, the system can include and display an applause meter and/or a decibel meter on a user interface of the user device 102 or the display screen 108 as shown in FIG. 5. The system can determine a collective "noise" at any given point in time based on how many users (e.g., fans) are moving (e.g., shaking) their mobile devices 102 and/or wearable devices 103 at the same time. The system can communicate the sound meter results live to various user interfaces including live sports broadcasts.

The system 100 can display the results on individual user interfaces of the user's mobile device 102 or on an interface connected to in a public establishment such as a display screen or Jumbotron 108. For example, the system can communicate the noise data for a particular team and/or mascot to a restaurant broadcast screen and/or sports stadium (e.g., Jumbotrons and/or any large-screen television designed to accommodate a very large venue). For example, the system can include on-site application that measures fan noise as well as "noise" from users located anywhere (e.g., bars, restaurants, watch parties).

In one embodiment, fan communities may compete with rival fan communities to establish the rowdiest fan base in a given game day matchup. The system 100 can display data related to other user devices 102 and/or wearable devices 103 that are active within the mobile application 114 in real-time. The system 100 may display users anonymously or the usernames of the users, if permitted via the user's privacy settings within the application 114. In an example, the system can display each individual user active on the application 114 so that users can see how many other users are active on the application 114.

In some embodiments, the system 100 may be incorporated in other mobile applications and systems such that the noise data can be monetized in support of social strategies for advertisers. For example, the system 100 can provide strategic alliances with various platforms such as SBNation.com, ScribbleLive, FanBase.net, etc. As the number of users and amount of noise activity generated by a collective activity of the users of the present application at a given point in time increases, the more entertainment value for sports fans seeking to connect with others and/or express their fanaticism and solidarity in support of their favorite teams.

The system 100 may collect user data from the users (e.g., sports fans) on a sport/team level as a valuable and monetizable asset for advertisers and marketers.

The system may include and/or engage with a social media platform. For example, with appropriate privacy settings, the system can access a network of friends or associates of a user engaged with the present application 114 through social media. The system can communicate the user's sound data and/or the collective sound data for a particular subject matter (e.g., event, team, mascot, sport, game, etc.) and display the sound data on a user's profile page and/or a page associated with the subject matter. In addition, the system can form collective sound data exclusively from a user's social network connections. For example, the system can compare the collective sound data from one user's social network connections to a plurality of user's social networks, and identify which user has the "loudest" social network.

In addition, the system can include forming a social network within a social media application by identifying and connecting users engaged with the present application such that users can opt in to join a social network related to a subject matter. For example, the system can connect various users who are fans of particular team, sport, event, etc.

The system can display the individual sound data and collective sound data on various user interfaces. For example, the system can graphically display the individual and/or collective sound data (e.g., duration, intensity, type, etc.) on a user interface associated with the mobile device of the user. For example, the system can display the sound data in the form of any graphic, such as, but not limited to, bar graphs, scales, meters, charts, animations, etc. The sound data can be displayed concurrently with the sound output corresponding to the sound data.

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:
1. A system comprising:
   a wearable device comprising a motion sensor configured to provide motion data;
   a user device comprising;
      a user device processor;
      a user device memory coupled to the user device processor, wherein the user device memory is configured to store program instructions executable by the user device processor;
      wherein in response to executing the program instructions, the user device processor is configured to:
         receive a user input from a user, wherein the user input corresponds to a sound;
         receive motion data from the wearable device; and
         determine sound data based on the motion data, wherein the sound data includes sound volume data; and
   a player device comprising:
      a player device processor in communication with a plurality of user devices including the user device;
      a player device memory coupled to the player device processor, wherein the player device memory is configured to store program instructions executable by the player device processor;

wherein in response to executing the program instructions, the player device processor is configured to:

receive a collective sound data from the plurality of users associated with a selected subject matter; and produce a collective sound output for the plurality of users at the same time based on the collective sound data, wherein the collective sound output is associated with the selected subject matter.

2. The system of claim 1, wherein the motion data is received from an accelerometer.

3. The system of claim 1, wherein the motion data is received from a gyroscope.

4. The system of claim 1, wherein the motion data includes at least one of directional data, rotational data, force data, and duration data.

5. The system of claim 1, wherein the wearable device comprises a motion sensor, wherein the motion sensor includes at least one of a tilt sensor, orientation sensor, gyro-sensor, and accelerometer, wherein the motion data is received from the sensor.

6. The system of claim 1, wherein the player device processor is further configured to graphically display the collective sound data associated with the plurality of users on one of the user device and a display.

7. The system of claim 1, wherein the player device processor is further configured to graphically display the sound data associated with the user on a user interface associated with the user device.

8. The system of claim 1, wherein the player device processor is further configured to graphically display the sound data associated with the user on a user interface associated with an establishment associated with the subject matter.

9. The system of claim 1, wherein the player device processor is configured to communicate the sound data to a sound output unit within the user device associated with the user based on the sound data.

10. A system comprising:
a wearable device comprising a motion sensor configured to provide motion data;
a player device comprising:
a player device processor in communication with a plurality of wearable devices including the wearable device;
a player device memory coupled to the player device processor, wherein the player device memory is configured to store program instructions executable by the player device processor;
wherein, in response to executing the program instructions, the player device processor is configured to:
receive motion data from the wearable device;
determine sound data based on the motion data, wherein the sound data includes sound volume data; and
receive a collective sound data from the plurality of users associated with a selected subject matter; and
produce a collective sound output for the plurality of users at the same time based on the collective sound data, wherein the collective sound output is associated with the selected subject matter.

11. The system of claim 10, further comprising a user device comprising;
a user device processor;
a user device memory coupled to the user device processor, wherein the user device memory is configured to store program instructions executable by the user device processor;
wherein in response to executing the program instructions, the user device processor is configured to:
receive a user input from a user, wherein the user input corresponds to a sound;
receive user device motion data from the user device; and
determine user device sound data based on the user device motion data, wherein the user device sound data includes user device sound volume data;
wherein the player devices receives user device sound data from a further plurality of users associated with the selected subject matter, and wherein the collective sound output includes the user device sound data.

* * * * *